United States Patent Office 3,842,006
Patented Oct. 15, 1974

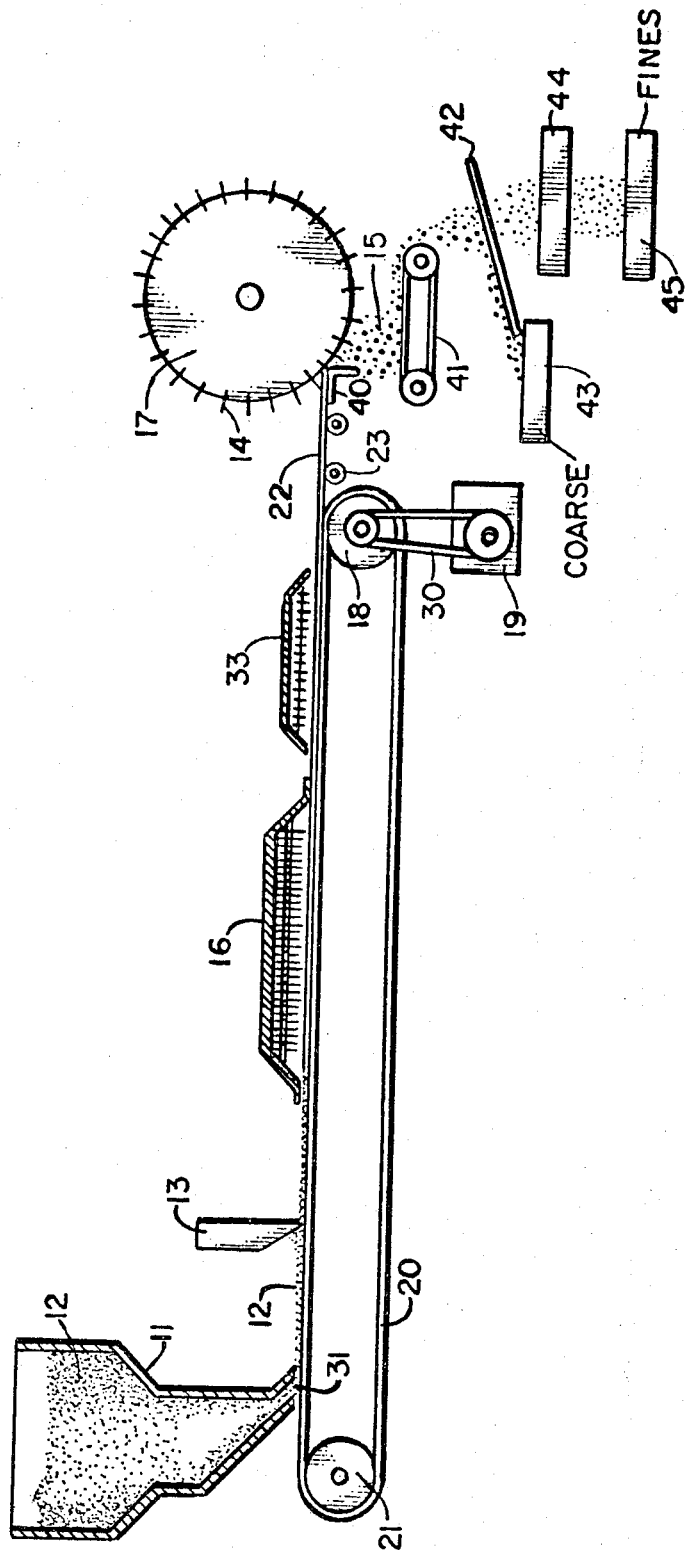

3,842,006
THERMOPLASTIC FILTER MEDIA AND
FILTERING PROCESS
William E. Burt, Baton Rouge, La., assignor to
Ethyl Corporation, Richmond, Va.
Original application May 22, 1970, Ser. No. 39,702, now abandoned. Divided and this application Feb. 15, 1972, Ser. No. 226,557
Int. Cl. B01d 37/00
U.S. Cl. 210—65                                  6 Claims

ABSTRACT OF THE DISCLOSURE

A process for removing solids from a liquid stream. The liquid is passed through a filter media containing discrete particles of porous polyvinyl chloride having irregular, non-uniform shaped surfaces. It is preferred that the plastic particles have a size from about 6 mesh to about 60 mesh. The plastic material is particulate polyvinyl chloride prepared by comminuting a porous body of sintered smaller polyvinyl chloride particles. The filters are characterized by extremely high throughput and high clarity of the effluent liquid. The filters can be backwashed in the same manner as conventional sand filters.

---

This is a division of application Ser. No. 39,702, filed May 22, 1970, now abandoned.

BACKGROUND OF THE INVENTION

Field of the Invention

This invention relates to a process for the filtration of liquids and to the particular porous filtration particles of polyvinyl chloride that are used in the process. Additionally, this invention relates to a process for the production of polyvinyl chloride filter media.

Description of the Prior Art

Water and other liquid purification facilities have used for many years conventional sand packed filters for clarification of solid contaminated liquids. In particular, municipal and industrial water treatment plants utilize large numbers of the conventional sand packed filters for clarifying surface water to render it suitable for further treatment in conversion to industrially and municipally usable water. Sand has been used as the water filtration medium primarily because of its ready availability, low cost, and reasonable life span. However, sand suffers from many disadvantages, primarily the low through-put of liquid through the sand limits the amount of satisfactory effluent that can be obtained from sand filters. Additionally, the sand filters require the installation of very heavy support structures and basin containers because of the extremely high density of the sand. While other materials have been used in filters in the form of discrete particles, none have found ready acceptance by the public. Certain diatomaceous earths have been used for particular applications, however, the high cost of these materials and their short life have rendered them only mildly acceptable.

Thus there is a recognized need in the art for a process and apparatus for clarifying liquids wherein high flow rates can be obtained with high efficiency as to the removal of solid matter from the liquid.

SUMMARY OF THE INVENTION

It is an object of the present invention to provide a process for the manufacture of porous polyvinyl chloride particles suitable for efficient filtration of solids from liquid streams.

It is a further object of the present invention to provide a process for clarifying liquids wherein high flow rates may be obtained through the filter media.

It is also an object of the present invention to provide a porous plastic filtration media which is highly efficient in removing solid matter from liquid.

It is still a further object of the present invention to provide a filtration media which can be installed in presently existing filter facilities.

The foregoing objects and other advantages that are brought out hereinafter are realized in the process aspects in a process for the manufacture of porous polyvinyl chloride filter media, which includes the steps of sintering polyvinyl chloride, cooling the sintered polyvinyl chloride, and comminuting the body of sintered polyvinyl chloride.

Further process aspects of the present invention are realized in a process for removing solids from a liquid which includes the step of passing the liquid through a bed of filter media which contains discrete, porous particles of polyvinyl chloride having either the same, or substantially different, specific gravities.

The product aspects of the present invention are realized in porous particles of polyvinyl chloride prepared by sintering smaller particles of polyvinyl chloride.

The process and product of the present invention are characterized by the extremely high throughput of liquids through filters made from the polyvinyl chloride particles of the present invention. Throughput for a conventional "rapid" sand filter is from about two to three gallons per minute per square foot of filter area. Throughput for the apparatus of the present invention using discrete, porous polyvinyl chloride particles having a size of from about 6 to 60 mesh is about 18 gallons per minute per square foot. The filtration efficiency of a filter prepared from the polyvinyl chloride filter particles of the present invention is greater than 70%, whereas the typical swimming pool filter made of sand has a filtration efficiency of approximately 50%.

DESCRIPTION OF THE DRAWING

The drawing depicts an apparatus for the manufacture of sintered, porous polyvinyl chloride filter media particles.

DESCRIPTION OF THE PREFERRED EMBODIMENTS

Like reference characters refer to like parts throughout the description and drawing.

Referring now to the drawing, numeral 20 indicates an endless belt conveyor which is extended at one end over a driving roller 18 and at the other end of an idler roller 21. The roller 18 can be driven from a motor 19 through a belt 30.

A feed hopper 11 is positioned above the belt, preferably above the idler roller 21 and is provided with an outlet 31 which extends transversely to the belt. Provision can be made, if desired, to vibrate the hopper 11 according to conventional practice to insure the free, uniform flow of particles across the desired width of the belt. The surface of the belt on which the particles are distributed is a plain surface and preferably is formed of or treated with a material to which the particles do not adhere during the operation of the process. Polyvinyl chloride particles 12 are distributed across the desired width of the belt and a loose layer or bed of individual particles is formed of desired thickness by stationary leveling knife 13 which extends transversely to the belt. The knife 13 is preferably adjustable in a vertical plane to increase or decrease the distance between its lower edge and the belt. The knife 13 permits reasonably accurate adjustment of the thickness of the bed of particles 12 to achieve uniform sintering.

The number 16 indicates the heating zone through which the bed or sheet of particles 12 is advanced towards the discharge end of the conveyor. Provision is made, such as by induction heating or by radiant heating coils, to produce and maintain in the bed of particles a temperature sufficiently high to cause incipient or surface fusion of individual particles as the sheet is advanved through the zone. Either or both the temperature maintained in the heating zone 16 and the speed of the belt can be adjusted to obtain the desired fusion of the surface of the particles without gross deformation of the shapes of the individual particles. The bed or layer of individual particles which enters the heating zone becomes during its passage through this zone a microporous sheet of individual particles firmly attached at a multiplicity of points on their surface to adjacent particles.

On leaving the heating zone the sheet is cooled to about atmospheric temperature. The rate of cooling can be increased by passing it through a cooling zone 33 in which air circulation or in which refrigerating coils are provided. On cooling to atmospheric temperature, the sheet is strong and rigid.

The rigid sheet passes from endless belt conveyor 20 over rollers 23 to a grinder. The grinder consists of grinder cylinder 17 and grinder plate 40. The teeth 14 of grinder cylinder 17 mesh with matching teeth in the grinder plate 40 thereby comminuting the rigid sheet 22 into small particles 15. However, if desired, the sintered sheet may be comminuted by other means such as a dicer or by passing the sheet into the nip of a pair of rotating hard rubber or metal rolls. The particles fall from the grinder plate 40 onto endless conveyor belt 41, which conveys the particles to sizing screen 42. The screen openings in sizing screen 42 are sufficiently small to exclude particles larger than the maximum particle size desired. A preferred screen opening is about 10 mesh (all mesh sizes are U.S. Standard Mesh). A more preferred opening is about 12 mesh. The large particles which remain on the screen 42 are removed from the screen by any conventional means, such as inclining the screen and vibrating the screen. The large particles removed from screen 42 are placed in a container such as box 43. The particles in box 43 are deposited on conveyor 22 at any point between cooling zone 33 and grinder cylinder 17 and recycled through the grinder and sizing screens.

The particles which pass through the screen 42 fall onto screen-box 44 which has a sizing screen for a bottom. The openings in screen 44 are chosen sufficiently small to retain only the smallest desired particles. A preferred screen opening for screen 44 is about 60 mesh. A more preferred opening is about 50 mesh. Provision can be made, if desired, to vibrate screen 44 and screen 42 according to conventional practice to insure the free flow of particles through each screen. The particles passing through screen 44 fall into box 45. The contents of box 45 is then transferred by any conventional means to hopper 11 for resintering. The particles remaining on the screen 44 have a maximum size smaller than the screen openings in screen 42 and a minimum size larger than the size of the screen openings in screen 44. The particles remaining on screen 44 are removed for use as filtration media.

The particles prepared in accordance with the present invention are highly suitable for use as filtration media. A large variety of polyvinyl chloride resins are suitable for preparing filter media in accordance with the present invention. Suitable polyvinyl chloride particles may be prepared by either the emulsion or suspension process.

The particular suspension or emulsion processes used to prepare the suspension or emulsion particles 12 is not critical in preparing a composition in accordance with the present invention. Among the many processes that may be used for preparing a suspension polymer suitable for use in preparing a composition in accordance with the present invention are those disclosed in the following U.S. patents: 2,511,592; 2,194,354; 2,476,474; 2,470,911; 2,580,277; 2,543,094; 2,564,291; 2,564,292; 2,594,375; 2,524,627; 5,211,811; and 2,528,469. Among the many processes that may be used for preparing an emulsion polymer suitable for use in preparing a composition in accordance with the present invention are those disclosed in the following U.S. patents: 2,068,424; 2,168,808; 2,404,791; 2,366,306; 2,419,347; 2,519,180; 2,475,016; 2,356,925; and 2,520,959. Both homopolymers and copolymers of vinyl chloride are suitable for use in the present invention.

Preferred polyvinyl chloride suspension resins are Ethyl Corporation SM-175 and SM-200. SM-175 is a polyvinyl chloride resin prepared by the suspension process and has a particle size distribution by weight of about 5% between 60 and 80 mesh, and about 35-40% between 80 and 100 mesh, about 40-45% between 100 and 140 mesh, about 10-15% between 140 and 200 mesh, and about 10% below 200 mesh in diameter (all mesh sizes are U.S. Standard Screen). SM-200 is a polyvinyl chloride resin prepared by the suspension process and has a particle size distribution by weight of about 3 to 15% between 60 and 80 mesh, about 30-50% between 80 and 100 mesh, about 30-50% between 100 and 140 mesh, about 5-15% between 140 and 200 mesh, and about 0-3% smaller than 200 mesh.

Emulsion resins suitable for sintering and comminuting in accordance with the process of the present invention preferably include EH-230 and EH-240 sold by Ethyl Corporation. EH-230 has a particle size distribution by weight of about 0-1% between 80 and 100 mesh, about 90% between about 100 to 200 mesh, and about 0-10% smaller than 200 mesh. EH-240 has a particle size distribution by weight of about 2% between 140 and 170 mesh, about 6% between 170 and 230 mesh, about 15% between 230 and 270 mesh, about 15% between 270 and 325 mesh, about 15% between 325 and 400 mesh, and about 47% smaller than 400 mesh.

Other suitable suspension resins include Hostalit C-260 manufactured by Farbwerke Hoechst, Vestolit S7041 manufactured by Chemische Werke Hüls, VC-265 manufactured by Borden Chemical Company, and Diamond 744 manufactured by Diamond Chemical Company. Other suitable emulsion resins include Vestolit P-1405-K and E-7004 manufactured by Chemische Werke Hüls, and Vinoflex E-343 manufactured by Badische Aniline and Soda Fabrik A.G.

The polyvinyl chloride particles may have incorporated therein various fillers prior to sintering. Incorporation of various amounts of various fillers in the polyvinyl chloride resin is an effective way to vary the specific gravity of the filter media. Suitable fillers include diatomite, cellulose, vermiculite, barytes, silica gel, bentonite, quartz, glass shot, china clay, carbon black coal dust, asbestos, and the like. The filler particles preferably may range in size from about 6 mesh to 60 mesh. The percentage of filler by total weight of solids may suitably range up to about 60%. The preferred range is from about 1% to about 30%.

A particularly preferred filler is Johns-Manville Celite 545, a diatomaceous earth filler having a particle size distribution by weight of approximately 6% above 150 microns, with about 11% of the particles being between 150-75 microns in size, about 23% lying between 75-45 microns, and about 60% of the particles being between 45-5 microns.

Several resins were sintered and comminuted in accordance with the process of the present invention, and filtration tests were run upon these particles. The filtration tests run upon the particles in Examples I and II utilized the testing procedure established by the National Sanitation Foundation Testing Laboratory, Inc., Ann Arbor, Mich., *Test Procedures for Sand-Type Filters*, published in April 1964, STD. No. 10, Test No. 3, which is entitled "Soil Removal." The test procedure is specified as follows:

"1. Fill the test tank with clean water to a volume that will give a fixed and easily measured turnover time (i.e. 1 hour). Collect about a 350 ml. sample of the unsoiled test water. Add to the required water volume in the test tank the indicated amount of test soil in the following manner:

(a) Weigh out proportionate quantities of silica and oil based on the water volume to be used in testing.
   Soil Ratios Per 1000 Gallons
   Silica: 1.0 lb./1000 Gallons
   Oil (SAE 10 ND): 20 grams/1000 Gallons
   (b) Add silica and oil to approximately 25 gallons of pool clarity water in a tank adjacent to pool. Mix vigorously (manually or mechanically).
   (c) With the proper quantity of water in the test pool and the rotary hydraulic agitation system in operation—slowly add the soil slurry.
   (d) Agitate until soil is uniformly distributed before commencing test. The hydraulic agitation system is to be operated throughout the test period.
   (e) Collect a 350 ml. sample of the water from the test tank and determine the quantity of soil as follows:
   Using a Hach Model 2100 photoelectric turbidometer or other photoelectric nephelometer of equal sensitivity calibrated in Jackson turbidity units, determine a baseline for turbid-free distilled water. Subtract this value from all other readings. Allow adequate warm-up time as indicated by the instrument manufacturer and insure that the sample is bubble free. Measure and record the turbidity of the clean test water and the soiled test water.

2. Place the filter in the filter cycle and operate at the manufacturer's recommended flow rate. The recommended flow rate shall be maintained throughout the test.*

3. After each complete turnover of the water volumes in the test tank a 350 ml. sample of the *effluent* water shall be collected. Complete at least 5 turnovers.

4. Determine the Jackson turbidity for each of the samples of effluent collected using the method described above. The overall turbidity removal in percentage of Jackson turbidity units shall not exceed the results obtained from operating a "rapid"** sand filter under comparable soil loading."

The soil used in the test was 140 mesh silica as specified by the National Sanitation Foundation, supplied by Fisher Scientific Company. The oil used was Esso "Handy" non-detergent oil.

The bulk density of the filter particles 15 may suitably range from about 18 pounds per cubic foot (lbs./cu. ft.) to about 30 lbs./cu. ft. A more preferred range is from about 20 lbs./cu. ft. to about 26 lbs./cu. ft.

The porosity (ratio of the volume of interstices of a particle to the volume of the particle) of the filter particles 15 may suitably range from about 25% to about 55%. A more preferred range is from about 35% to about 45%.

The pore size of the filter particles 15 may suitable range from about 10 microns to about 50 microns. A more preferred range is from about 20 microns to about 40 microns.

EXAMPLE I

Polyvinyl chloride filtration media particles were prepared by sintering Ethyl Corporation EH–230 and grinding the sintered sheet into particles. The total time the polyvinyl chloride particles were within the heating zone was about 5 to 6 minutes and the total time within the cooling zone was 2 to 3 minutes. The heating zone was operated at a temperature of 210° C., and the cooling was accomplished by blowing air at 35° C. Screen 42 had a mesh size of 12 mesh and screen 44 had a mesh size of 30 mesh. The particle size distribution of the filter media was about 19.8% between 12–16 mesh, 38% between 16–20 mesh, 24.5% between 20–35 mesh, 21.1% between 25–30 mesh with about 5.5% smaller than 30 mesh. Bulk density was 21 pounds per cubic foot. Porosity was 33%. The filter media was tested according to the National Sanitation Foundation testing procedure previously described and gave a five turnover turbidity reduction (filtration efficiency) of 78%.

EXAMPLE II

Polyvinyl chloride filter media was prepared as in Example I with the exception that the particle size distribution of the filter media was about 23.8% between 12–16 mesh, about 44.6% between 16–20 mesh, about 18.1% between 20–25 mesh, about 9.7% between 25–30 mesh and approximately 3.4% smaller than 30 mesh. The polyvinyl chloride filter media was tested according to the National Sanitation Foundation procedure and gave a five turnover turbidity reduction (filtration efficiency) of 72%.

EXAMPLE III

A typical swimming pool filter sand was tested according to the National Sanitation Foundation procedure. The sand filter had a filtration efficiency of about 50%.

Examples V through VII were prepared as in Example I, but a different filtration testing procedure was used. Example III is sand tested according to the different testing procedure. The testing procedure used for Examples IV through VI, hereinafter referred to as the Mapico Black procedure, was as follows:

Apparatus and Procedure for Filtration Tests

The laboratory filtration unit included a rectangular tank for containing the turbid water. The filter media was contained in a hollow metal cylinder 48 inches in height and 2¼ inches in diameter. The cylindrical container was located in an upright position, with the top of the container having an opening therein for admission of fluids. The bottom of the container had a hole therein for passage of the effluent. The filter media was supported by a metal support located one inch from the bottom of the container. The support had holes therein smaller than the smallest sized filter particle for passage of the effluent. The tank was filled with turbid fluid and the turbid fluid was pumped into the top of the filter media container. The turbid fluid would then flow through the filter and out of the hole in the bottom of the container. The filter effluent was pumped continuously through a Hach CR (continuous reading) Low Range Turbidimeter, Model 1720 and returned to the rectangular tank. The water capacity of the tank system was 12.55 gallons. The turbidity of the filter effluent was read on a master indicator connected to the Hach Turbidimeter. The turbidity was measured in Jackson Turbidity Units (JTU). By defini-

---

*The actual flow rate was 18 gallons per minute per square foot.
**"Rapid" refers to a sand filter operating a flow rate of 3–5 gallons per minute per square foot.

tion, one JTU is the turbidity produced by one p.p.m. of fuller's earth. Other materials produce different results. However, the JTU is a precise measure of turbidity by light reflectance regardless of material causing the turbidity. The master indicator has four ranges of turbidity, 0–0.2, 0–1.0, 0–3.0, and 0–30 JTU.

The tank was filled with clear tap water and the filter media added to the desired depth in the 2¼ inch diameter filter media container to form the filter bed. The pump supplying the feed vessel was started and the filter bed backwashed for 5 minutes. The filter bed was allowed to settle, classifying the particles, fines on top and coarse at the bottom of the filter bed. Forward flow of clean tap water (6 g.p.m./ft.$^2$ or 15.2 g.p.m./ft.$^2$) downward through the filter bed was started and allowed to run until the turbidimeter shows less than 1.0 JTU which is a baseline and indicates the unit was working properly. The pressure drop through the fresh filter bed was measured. The proper amount of Mapico Black, $Fe_3O_4$ having particle size range of 0.3 to 0.8 microns, and manufactured by Columbian Carbon, suspended in 400 ml. of tap water in a Waring Blender was added to the reservoir water with stirring to start the test. The peak turbidity was determined and periodic readings were recorded over a 4 to 5 hour period. Terminal pressure drop through the filter bed was measured and the filter bed was backwashed for about 5 minutes to permit observation of how well the soil (Mapico Black) separates from the filter media and to determine filter bed expansion versus backwash flow rate.

Operating Conditions for Filtration Tests (1) The filter medium bed height was 19 to 21 inches for the evaluation of the different media and the effect of different particle size of the media on filtration effectiveness.

(2) The forward flow rate (downward through the filter bed) was 6 gallons per minute (g.p.m.) per square feet of filter bed area for both the 12–26 and 26–40 sieve number PVC particles. The backwash flow rates were 17 g.p.m./ft.$^2$ for the 12–26 mesh PVC particles and 4 to 7.5 g.p.m./ft.$^2$ for the 26–40 sieve number PVC particles.

(3) The turbidity standard used to evaluate the filter media was 0.94 g. of Mapico Black (iron oxide, particle size 0.3 to 0.8 microns) slurried in 12.55 gallons of tap water to give a turbidity of 20 Jackson Turbidity Units (JTU).

It can be seen from the examples that filter media prepared from polyvinyl chloride in accordance with the present invention is very efficient in reducing the turbidity of fluids such as water. A typical swimming pool filter sand was tested (Example III) according to the National Sanitation Foundation procedure and efficiencies of approximately 50% were obtained. Filtration media prepared in Examples I and II of the present invention were tested according to the same procedure and had filtration efficiencies greater than 70%, which is approximately 50% greater than typical sand filters.

The final turbidity of the effluent filtered in accordance with Examples V, VI, and VII (2.7, 2.2, and 3.2, respectively) was approximately one-half as large as the final turbidity of effluent filtered in the sand filter of Example IV (5.0).

The filtered media prepared in accordance with the present invention can be used in virtually all types of filtering apparatus which employ solid particulate filter media such as sand. The filter media may be enclosed completely within the filter, such as in a cylindrical filter having filter media tightly contained therein, an entrance port at one end of the cylinder, and an exit port at the other end of the cylinder. The filter media of the present invention may also be used in an open bed type cylinder.

The particles of the present invention are particularly well suited for use in stratified filter beds such as are disclosed in U.S. Pat. 3,343,680, which is hereby incorporated by reference. Stratified filter beds are filter beds comprising a continuously increasing number of particles of filter media per unit volume in the direction of filter flow, the bed having particles of at least two different specific gravities, the particles of each specific gravity being within a discrete size range, the relative size range being inverse to the relative specific gravity.

In filters provided heretofore with a multiple number of layers of material of different particle size, care has been taken to maintain the layers as discrete entities and to avoid mixing of the layers. This is directly contrary to the makeup of the stratified filter beds which require that the media be intermixed. The intermixing is not uniform, since uniformity is, in fact, undesirable. The mixing is

TABLE OF EXAMPLES

| Example No. | Filter material | Particle size, U.S. mesh | Bed height, inches | Head loss, inches | | | Length of run, hrs. | Turbidity of effluent JTU | | |
|---|---|---|---|---|---|---|---|---|---|---|
| | | | | Initial | Final | H | | Initial | Peak | Final |
| IV | Sand | 28–35 | 19 | 22 | 24 | 2 | 7 | 1.1 | 19.5 | 5.0 |
| V | EH–230 | 12–26 | 21 | 7 | 7.25 | 0.25 | 5 | 0.9 | 16.0 | 2.7 |
| VI | EH–230 | 26–40 | 20 | 26.5 | 42.75 | 16.25 | 5 | 0.4 | 5.0 | 2.2 |
| VII | SM–175 | 10–30 | 21 | 7.5 | 8.5 | 1 | 5 | 0.7 | 19.0 | 3.2 | rather such that the bed will have a progressively larger number of particles per unit volume in the direction of the filter flow. This grading of particles is most easily attained by placing the particles of filter media which are to form the bed in the container therefor, the particles being selected with respect to size and specific gravity, and thereafter backwashing the bed until the particle distribution has reached a substantially constant orientation. If the particles selected comprise, for example, relatively large particles of a material of relatively low specific gravity, relatively small particles of a material of relatively low specific gravity, relatively small particles of a material of relatively high specific gravity, and particles of intermediate size of an intermediate specific gravity, the filter bed, after backwashing, will at its very top have a relatively large number of the large particles, a smaller number of the intermediate particles and a still smaller number of the finer particles. At an intermediate portion of the bed the intermediate particles will predominate in number and the larger and smaller particles will be fewer in number, though the number of smaller particles will be greater than at the top. At the bottom of the filter bed the smaller particles would predominate in number, there would be fewer of the intermediate particles and still fewer of the large particles.

The absolute value of the specific gravity of each of the filter media forming the filter is not important, so long as there is a difference of from about 0.5 to about 1.0 in specific gravity. The minimum amount of each of the filter media should be about 10 weight percent.

The advantages of a stratified filter bed are that the coarse particles on top remove the larger suspended solids, and the finer particles in the lower part of the bed remove the smaller suspended solids in the liquid and in this way increase the total capacity of the bed to remove suspended solids from water. The following examples illustrate the stratified filter bed of the present invention:

EXAMPLE VIII

To prepare polyvinyl chloride filter media with a specific gravity greater than 1.4 (the specific gravity of polyvinyl chloride), about 33 weight percent of barium sulfate was added to a batch of EH–230 resin prior to spray drying the resin. The EH–230 resin containing barium sulfate was then sintered and comminuted as in Example I. The specific gravities of the two materials tested were as follows:

| Material: | Specific gravity |
|---|---|
| EH–230 (Prepared as in Example I) | 1.4 |
| PVC containing 33% by weight barium sulfate | 2.43 |

About 150 grams of each of the above filter media were placed in the filter bed used in the Mapico Black filter test procedure. The less dense filter media was put in first on the bottom of the bed and then the filter media containing 33% by weight barium sulfate was added. Backwashing the bed caused complete inversion of the materials with the less dense filter media rising to the top of the bed, thus indicating that the difference in density was sufficient to permit a clean separation of the two materials. Filtration ability of the bed was then tested according to the Mapico Black procedure. The bed was found to be slightly less effective as a filter than the filter media of Example I.

EXAMPLE IX

A three-component inverted filter bed was prepared from (a) 210 grams of filter media prepared in accordance with Example I, having a particle size of 12–16 U.S. Mesh, bulk density of 0.565, and a specific gravity of 1.4; (b) 197 grams of filter media prepared as in Example I with the exception that 20% barium sulfate was added to the EH–230 latex prior to spray drying the latex, the filter media having a particle size of 16–25 U.S. Mesh, bulk density of 0.505, and a specific gravity of 2.02; and (c) 202 grams of EH–230 prepared in accordance with Example I with the exception that 33% barium sulfate was added prior to spray drying EH–230 latex, the filter media having a particle size of 25–30 U.S. Mesh, bulk density 0.515, and a specific gravity of 2.43. All the particles were mixed together and then added to the filter media container. The bed height was 6 inches. The filter media container used was the same bed used in the Mapico Black Filtration Procedure.

On backwashing the filter bed at 20 g.p.m./ft.$^2$, the coarse polyvinyl chloride filter media came to the top of the bed and gave a fair degree of separation from the two heavier fractions. Most of the finer, heavier particles of filter media migrated to the bottom and the intermediate filter particles remained in the middle.

EXAMPLE X

The three-component filter of Example IX and a filter composed entirely of sintered and comminuted EH–230 prepared in accordance with Example I were prepared in filter bed heights of 18–19 inches and tested using the Mapico Black Filtration Procedure. The results are summarized below:

Turbidity standard: Mapico Black 20 p.p.m.=20 JTU
Water flow rate: 6 g.p.m./ft.$^2$
Filter bed height: 18–19 inches

| Filter media | EH–230 | Three component |
|---|---|---|
| Particle size, sieve number | 12–26 | 12–30 |
| Pressure drop through bed, inches of H$_2$O | 10 | 11.5 |
| | JTU | JTU |
| Time, hours: | | |
| 0 | 20 | 20 |
| 0.25 | 14 | 16 |
| 0.50 | 9.8 | 10.2 |
| 0.75 | 7.8 | 8.0 |
| 1.0 | 6.8 | 7.1 |
| 2.0 | 4.3 | 5.0 |
| 3.0 | 3.4 | 4.0 |

The above data indicate that the three-component filter bed is equivalent to EH–230 prepared in accordance with Example I in filtration effectiveness in addition to offering the advantage of an inverted bed, i.e., a filter bed with coarse particles on top to remove the largest suspended particles and the finer particles on the lower part of the bed to remove the smallest suspended solids in the water.

What is claimed is:

1. In a process for removing solids from a liquid passed through a filter media consisting of discrete particles, the improvement comprising passing said liquid through a filter comprising:
   (a) a bed having a continually increasing number of particles per unit area in the direction of water flow through the bed;
   (b) said particles comprising discrete particles of sintered polyvinyl chloride having a particle size range of from about 6 to about 60 mesh, a bulk density of from about 18 lbs. per cubic foot to about 30 lbs. per cubic foot, and a porosity of from about 25 percent to about 55 percent;
   (c) said particles comprising intermixed filter media of at least two different specific gravities; and
   (d) there being at least 10 percent by weight of a media of each specific gravity present.

2. The process of Claim 1 wherein said polyvinyl chloride is made by an emulsion process.

3. The process of Claim 1 wherein said polyvinyl chloride is made by a suspension process.

4. The process of Claim 1 wherein said liquid is water.

5. A filter for filtration of water comprising:
   (a) a bed having a continually increasing number of particles per unit area in the direction of water flow through the bed;
   (b) said particles comprising discrete particles of sintered polyvinyl chloride having a particle size range of from about 6 to about 60 mesh, a bulk density of from about 18 lbs. per cubic foot to about 30 lbs. per cubic foot, and a porosity of from about 25 percent to about 55 percent;
   (c) said particles comprising intermixed filter media of at least two different specific gravities; and
   (d) there being at least 10 percent by weight of a media of each specific gravity present.

6. The product of Claim 5 wherein said particles comprising intermixed filter media have at least three different specific gravities.

References Cited

UNITED STATES PATENTS

| 2,371,868 | 3/1945 | Berg et al. | 210—510 UX |
| 3,557,955 | 1/1971 | Hirs et al. | 210—67 |
| 3,550,774 | 12/1070 | Hirs et al. | 210—67 |
| 3,695,433 | 10/1972 | Hirs | 210—67 |
| 2,400,091 | 5/1946 | Alfthan | 210—510 X |
| 2,297,248 | 9/1942 | Rudolph | 210—510 X |
| 3,048,537 | 8/1962 | Pall et al. | 210—510 |

THEODORE A. GRANGER, Primary Examiner

U.S. Cl. X.R.

210—263, 510